United States Patent

Owen, Jr. et al.

[11] 4,105,308
[45] Aug. 8, 1978

[54] ASPHERIC PLASTIC TRIPLET

[75] Inventors: R. Calvin Owen, Jr., Acton; William T. Plummer, Concord, both of Mass.

[73] Assignee: Polaroid Corporation, Cambridge, Mass.

[21] Appl. No.: 756,260

[22] Filed: Jan. 3, 1977

[51] Int. Cl.² .......................... G02B 3/04; G02B 9/14
[52] U.S. Cl. .......................... 350/189; 350/175 NG; 350/226
[58] Field of Search .................. 350/189, 175 NG, 226

[56] References Cited

U.S. PATENT DOCUMENTS

| | | | |
|---|---|---|---|
| 3,578,847 | 5/1971 | Grey | 350/226 |
| 3,762,801 | 10/1973 | Baker | 350/226 X |
| 3,910,685 | 10/1975 | De Jager | 350/226 |
| 3,944,337 | 3/1976 | Ruben | 350/226 X |
| 3,967,884 | 7/1976 | De Jager | 350/226 |

*Primary Examiner*—Paul A. Sacher
*Attorney, Agent, or Firm*—Edward S. Roman

[57] ABSTRACT

A multi-element photographic lens has a strongly aspheric surface formed on a strong lens element that is movable relative to the other elements along a common optical axis. The aspheric surface corrects at least the lower order aberrations contributed by the movable element thereby allowing the movement to focus the lens over a wide focus scale or object distance. Preferably, the elements are formed of plastic, the movable element is a front element, and at least one other aspheric surface is formed on a lens element.

10 Claims, 19 Drawing Figures

ASPHERIC PLASTIC-TRIPLET

BACKGROUND OF THE INVENTION

This invention relates in general to photographic lens systems. More specifically it relates to multi-element photographic lenses having a movable element to provide an adjustable focus over a wide focus scale. In particular, the lens of this invention is advantageously made of plastic with high volume production techniques and for self-developing cameras.

One of the more common expedients for broadening the capabilities of a camera, whether it is a conventional camera or a camera designed for use with self-developing film, is to provide an adjustable focus. Most conventional 35 mm cameras have a unit focus where all of the optical elements forming the lens move axially in unison to change the focus. An alternative arrangement is to change the focus through the movement of a single lens element, usually the front element. Front element focus has numerous advantages over unit focus, including a fixed back focal length and reduced travel. The fixed back focal length is particularly advantageous in rigid self-developing cameras, and where it is desired to position an aperture stop behind the rear lens element. The reduced travel can eliminate or reduce the travel of an expansible bellows system together with mechanical linkages to exposure mechanisms.

Despite these clear advantages, unit focus is often used because it is more difficult to design a lens that corrects important aberrations and maintains corrections when one of its elements is moved axially with respect to the others. In the case of a triplet lens, there are just enough degrees of freedom to achieve a desired focal length and the necessary level of correction. When one of the degrees of freedom, in this case the spacing or air gap between the front and second elements, is not fixed, the design problem is significantly more difficult. Moreover, the solution may achieve a tolerable level of correction over a focus range at the expense of other performance criteria of the lens such as its aperture ratio, or cost considerations such as an increased number of elements.

U.S. Pat. No. 3,578,847 to Grey discloses a front element focusing telephoto triplet that has proven highly successful for use in conjunction with rigid self-developing cameras. A significant advantage of this design, in addition to those mentioned above, is that the lens elements are formed of plastic materials that lend themselves to low cost, high volume production techniques. Another significant advantage is that the lens is a self-contained modular unit that can be removed and replaced separately from the exposure mechanism. While this lens has a relatively large focus scale, i.e., infinity to approximately 3.5 feet, its focus range is only about one-third of that of the front element focus lens employed in the camera sold by the Polaroid Corporation under the registered designation SX-70. The latter lens can focus to approximately 10.4 inches, but requires a costly high index glass for its front element.

For reasons of both design convenience and manufacturing cost, refracting surfaces of the lens elements are almost always spherical. Aspheric surfaces, however, are well known in optical systems for correcting spherical aberration. Aspheric mirrors, for example, are used routinely to correct spherical aberration in reflecting telescopes. Aspheres have also been employed on photographic lens elements. However, since it is straightforward to correct low order spherical aberration with additional lens elements, particularly in zoom lenses where there are necessarily a large number of elements, it is rarely necessary to incur the substantial cost of grinding and polishing aspheres on glass. Thus, traditionally aspheres are employed in lens design only where higher order aberrations become significant, usually when a very fast lens is desired, or when the aspheres can justify the attendant cost by reducing the number of lens elements. For example, U.S. Pat. Nos. 2,552,672 to Grey, 3,762,801 to Baker and 3,910,685 to DeJager all describe aspheric surfaces on glass lens elements to control higher order spherical aberration. It is significant to note that these aspheres are relatively weak, that is, the departure from sphericity is not severe.

In recent years there has been an increasing use of lens elements formed of plastic materials that have significant advantages compared to glass. In plastic lenses weak aspheres have been used in their well-known roles to correct higher order aberrations in fast lenses or to reduce the number of elements in the lens. For example, U.S. Pat. No. 3,905,686 to Ruben discloses aspheres on a negative middle element of a plastic projection lens to control higher order spherical aberration. This lens has a large aperture ratio, $f/1.8$. Similarly, U.S. Pat. No. 3,912,379 to DeJager discloses a triplet having a plastic negative element with two aspheric surfaces that control spherical aberration at high relative apertures. U.S. Pat. No. 3,902,792 to Plummer, one of the present applicants, discloses an asphere on a fixed focus landscape lens having only one element.

Along the same line, U.S. Pat. No. 3,972,592, also issued to Ruben, discloses a six element zoom lens having an asphere formed on a second plastic element that translates to affect a change in magnification of the lens. As noted above, with six elements, lower order spherical aberration is readily corrected without aspheres. Accordingly, the Ruben zoom lens utilizes a relatively weak aspheric surface to correct higher order aberrations while providing a relatively high aperture ratio, $f/1.57$, with relatively few elements. As the second element moves over its range of magnification, the entire lens is unit focused with a corresponding change in the back focal length. Focus adjustment is likewise effected by unit focus in the Ruben U.S. Pat. No. 3,905,686 lens and in the DeJager U.S. Pat. No. 3,910,685 and U.S. Pat. No. 3,912,379 lenses. In these lenses, the element or elements having the aspheric surface or surfaces are fixed with respect to the other lens elements.

It is therefore a principal object of this invention to provide a multi-element photographic lens with single element focus that has an improved focus range.

Another principal object of this invention is to provide such a lens where the lens elements are formed of plastic materials.

Yet another object of this invention is to provide a lens with these advantages that has a fixed back focal length and is suitable for use in a rigid self-developing camera.

A further object is to provide such a lens that also has a relatively low cost of manufacture and lends itself to high volume production techniques.

Yet another object is to provide such a lens with an aperture ratio of approximately $f/9.2$ for good depth of field and which can focus from infinity to approximately two feet.

SUMMARY OF THE INVENTION

A multi-element lens according to the invention has a strong element that translates axially to focus the lens and which has a strongly aspheric surface. The aspheric surface corrects lower order aberrations contributed by the moving element to maximize its performance and thereby maintain the balance of corrections between the lens elements during the focusing movement. At least one other aspheric surface is preferably formed on one of the lens elements. Also in a preferred form, the lens elements are formed of a plastic material, the movable element is the front element of the lens, and the first asphere is formed on its rear concave surface. A preferred triplet embodiment includes a strong positive front element with a strong asphere formed on its rear surface, a negative second element with an aspheric rear surface, and a positive third element. The front element is mounted for axial movement relative to the second and third elements to affect focusing.

These and other features and objects of the invention will be more fully understood from the following detailed description of the invention which should be read in conjunction with the accompanying drawings.

DETAILED DESCRIPTION OF THE ILLUSTRATED EMBODIMENTS

Figure 1:
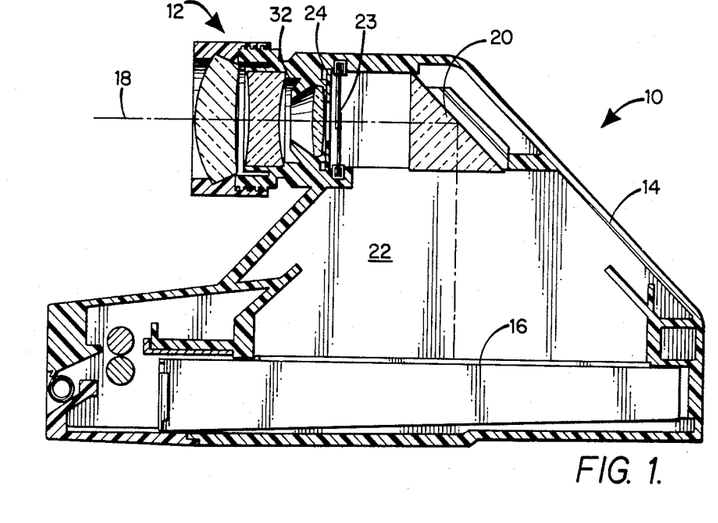
FIG. 1 is a view in vertical section of a self-developing camera incorporating a lens system constructed according to the invention.

FIG. 1 shows a self-developing camera 10 that incorporates an adjustable focus lens system 12 according to the invention. While the invention is described herein as used only with cameras of the self-developing type, it will be understood that it encompasses photographic lenses designed for use in conventional cameras as well as other photographic equipment such as projectors. The camera 10 has a housing 14 that holds a cassette 16 containing a stack of self-developing film units. In a preferred form, the camera and film units are generally of the type marketed by the Polaroid Corporation under the trade designations "Pronto!" and "SX-70", respectively. Light from an object field, represented by an axial ray 18, enters the camera through the lens 12. A reflecting element 20 directs the ray 18 through an exposure chamber 22 to expose an uppermost film unit held in the cassette 16 with its photosensitive layers substantially coincident with the film plane. A conventional exposure mechanism including a shutter 23 and a rear aperture 24 are located directly behind the lens 12. For the purposes of this discussion, light energy will be assumed to travel through the lens from the object field to the film plane in a left to right, or front to rear, direction.

Figures 2, 4, 5:
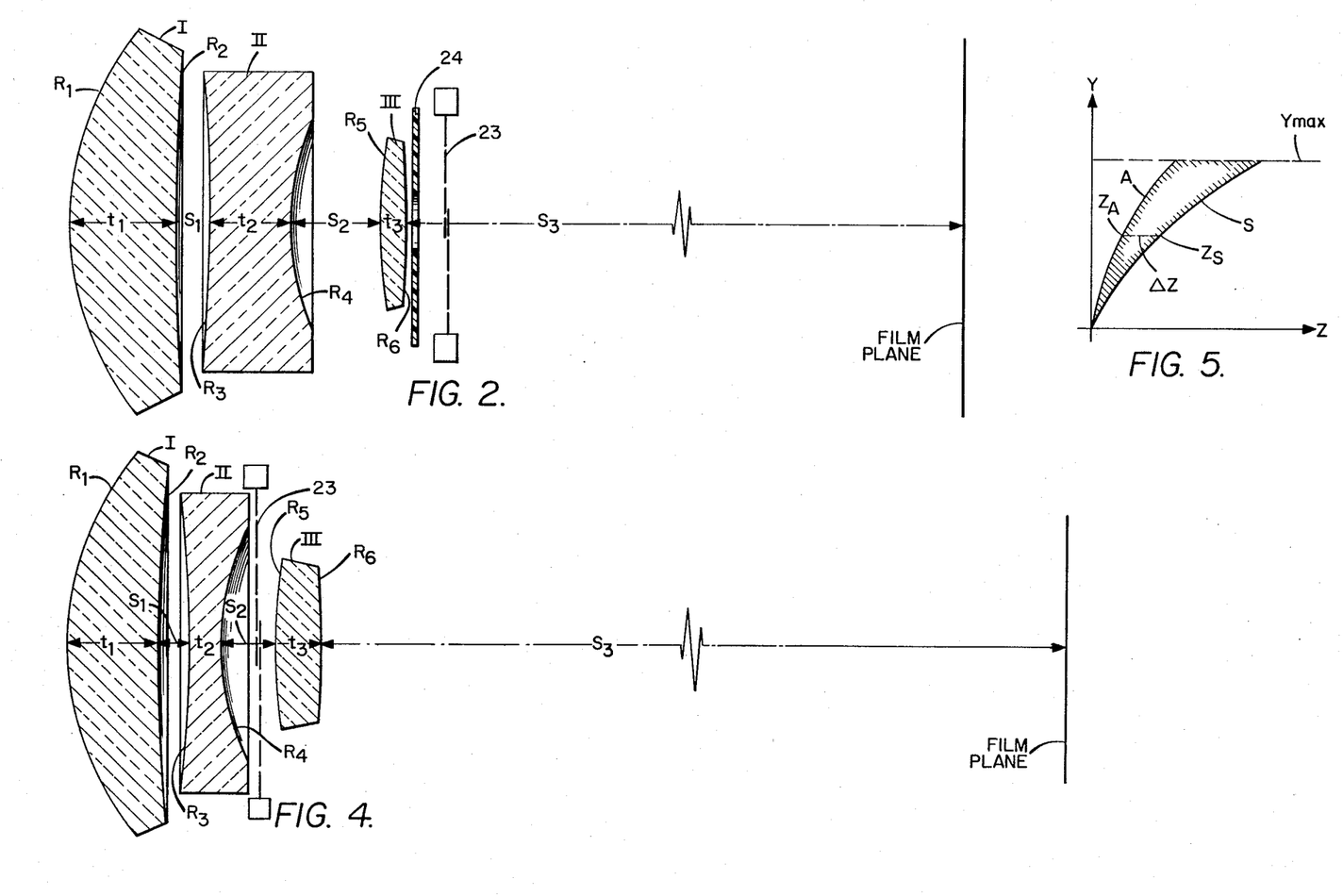
FIG. 2 is a diagrammatic cross-sectional view of the front element focusing plastic triplet shown in FIG. 1.
FIG. 4 is an alternative triplet embodiment of the invention.
FIG. 5 is a graph that compares the aspheric surface A to the spherical surface S at the vertex of the asphere, with the Y-axis representing the radial distance to the surface from the optical axis and the Z-axis representing the distance to the surface from a reference plane perpendicular to the optical axis and tangent to the vertex.
Figure 3:
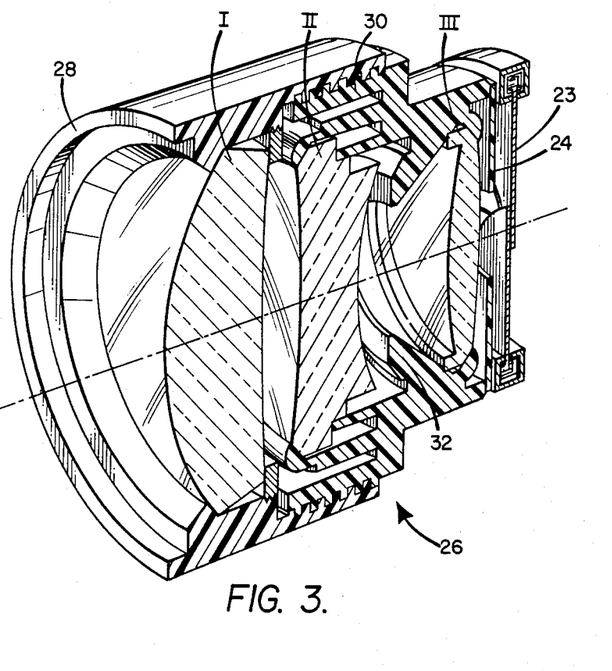
FIG. 3 is a detailed perspective view of the lens shown in FIGS. 1 and 2.

With reference to FIGS. 2 and 3, the lens 12 is a telephoto triplet having a positive first element I, a negative second element II and a positive third element III. These elements are centered on the optical axis and mutually spaced from one another by air gaps. The front element I is strongly converging and movable along the optical axis with respect to elements II and III, which together are fixed, to change the focus of the lens. While a "strong" lens, whether positive or negative, is generally one that has a relatively high power or ability to bend light rays, for the purposes of this discussion, a single lens element is termed "strong" if it has at least twice the focusing power of the entire lens as a unit. Focusing power, in turn, is measured by the reciprocal of the effective focal length of the lens element or lens under consideration. A shutter 23 and a rear aperture stop 24 are positioned directly behind and spaced from the rear surface R6 of the third element III.

The elements I, II and III are preferably formed of plastic materials. While the choice of plastic material will of course vary with the lens design, in the embodiment shown in FIGS. 1-3, the first element is preferably formed of polymethyl methacrylate and the second and third elements are preferably formed of polystyrene. These elements are fabricated by standard injection molding techniques, utilizing stainless steel masters or inserts, that can quickly form a large number of lens elements. The elements are of acceptable commercial quality without further grinding and polishing operations, subject to usual quality control procedures. Plastic offers significant cost advantages as compared to glass, particularly high index glass, due to both lower material costs and manufacturing economies. Another significant advantage of plastic as the lens material is that aspheric surfaces can be machined on the molding insert. As a result, the inserts can produce high volumes of lens elements with aspheric surfaces accurate to close tolerances without grinding and polishing each element individually.

A principal feature of this invention is a strongly aspheric surface formed on the rear surface R2 of the strong moving element I. The aspheric curvature is given by the equation $$Z = \frac{Y^2}{R[1 + \sqrt{1 - (CC + 1)\frac{Y^2}{R^2}}]} + \quad (1)$$

$$A_d Y^4 + A_e Y^6 + A_f Y^8 + A_g Y^{10}$$

where Z is the "height" of the asphere along the optical axis measured from a reference plane tangent to its vertex and perpendicular to the axis; Y is the radial distance of the aspheric surface from the optical axis; CC is a conic constant, usually −1, 0 or +1; R is the radius of curvature of a comparison sphere at the vertex of the aspheric surface; and $A_d$, $A_e$, $A_f$ and $A_g$ are the fourth, sixth, eighth and tenth order constant aspheric coefficients, respectively. While the invention is described herein with reference to aspheres that are conic sections with polynomial terms added up to the tenth order, it will be understood that the invention is not limited to conic sections nor to any specific order of polynomial.

It is also useful to have a numerical measure of the degree to which an aspheric surface departs from sphericity. With reference to FIG. 5, where S represents a spherical comparison surface passing through the vertex of an aspheric surface A, $Z_s$ is the "height" of the spherical surface S, $Z_a$ is the "height" of the aspheric surface A, and $\Delta Z$ is the difference between $Z_s$ and $Z_a$ for a given radius Y, a convenient numerical measure of the departure of an asphere from sphericity is given by the expression $$a = \frac{\int_0^{Y_{max}} \Delta Z \, dY}{Y^2_{max}} \quad (2)$$

$Z_a$ is given by equation (1) and $Z_s = R(1 - \sqrt{1 - (Y/R)^2})$. This "alpha" number can be viewed as the area between the S and A curves, normalized to allow the comparison of aspheric lens elements of different diameters ($Y_{max}$).

While it is difficult to draw a line between a "strong" and "weak" asphere strictly in terms of a single numerical coefficient such as its "alpha" number, it is nevertheless clear that a relatively "strong" asphere, that is one with a significant departure from sphericity, is necessary to correct lower order aberrations in a strong lens element and thereby maximize the optical performance of that element. In contrast, with few exceptions, aspheres used heretofore in both glass and plastic lenses are directed to correcting higher order aberrations and can be characterized as relatively "weak", that is having a relatively small departure from sphericity. For example, relatively weak aspheres are employed in the lenses described in the Baker, DeJager U.S. Pat. No. 3,910,685 and Ruben U.S. Pat. No. 3,972,592 patents discussed hereinabove. In general, a strong asphere will have a larger alpha number than a weak asphere. The strength of an asphere can also be gauged by standard interferometrical testing of the asphere against a spherical element. The departure of the asphere from the sphere at the periphery of the asphere for a strong asphere will usually be at least two fringes.

FIG. 3 shows a suitable structure for mounting the triplet shown in FIGS. 1 and 2 for front element focusing. (It should be noted that certain details of the lens elements II and III which do not affect the optical performance of the lens elements are omitted from FIGS. 1 and 2 for clarity.) The structure is generally similar to that described in the aforementioned U.S. Pat. No. 3,578,847 to Grey. A mounting bracket or cell 26 secures the elements II and III in a spaced axial alignment. A bezel 28 that holds the front element I is threadedly engaged on an outer lip 30 of the cell 26. The bezel surrounds the lip 30 and the threads preferably have a square cross section. Rotation of the bezel 28 axially translates the element I with respect to the elements II and III to change the focus. An annular spring (not shown) located between the bezel and the cell can provide slight biasing force to reduce play in the focusing travel. A light baffle 32 integral with the cell 26 and located between the elements II and III controls flare. While a light shade is optically preferably, the baffle 32 is preferred for commercial reasons since it does not add to the overall length of the lens system.

It will be readily apparent to those skilled in the art that this structure is adapted to high volume assembly techniques. It also provides the advantages attendant a front element focusing lens such as a fixed back focal length, ability to employ a rear aperture situated behind the rear element III, the elimination of a bellows and costly mechanical linkages to the exposure mechanisms, and the ability to replace the lens without also replacing the exposure mechanism. In particular, the front element focus travel with the lens 12 is approximately ten times less than the focus travel for a comparable lens using unit focus. This arrangement also has other advantages discussed in the Grey U.S. Pat. No. 3,578,847 patent including a high degree of compatibility with rigid self-developing cameras.

By way of illustration, but not of limitation, with reference to FIGS. 1–3, the table below captioned "Example A" sets forth design parameters for an $f/9.2$ telephoto triplet with an effective focal length of 114.3 mm and a half field angle of 26.4°. The $f/9.2$ numerical aperture ratio provides a good depth of field. This lens is particularly adapted for use in a rigid self-developing camera such as the camera marketed by Polaroid under the registered designation "Pronto!".

EXAMPLE A

| Lens Element | Refractive Index | Abbe' Value | Material | Surface Radii | Thickness and Spacing |
|---|---|---|---|---|---|
| I | 1.49 | 57.2 | Polymethyl Methacrylate | $R_1 = 0.782023$<br>$R_2 = 125.366*$ | $t_1 = 0.258$<br>$s_1 = 0.067$<br>(at $\infty$) |
| II | 1.59 | 30.8 | Polystyrene | $R_3 = -5.724178$<br>$R_4 = 0.666047*$ | $t_2 = 0.198$<br>$s_2 = 0.206$ |
| III | 1.59 | 30.8 | Polystyrene | $R_5 = 1.772864$<br>$R_6 = -4.44798$ | $t_3 = 0.051$<br>$s_3 = 3.60$ |

In the above table, R is the radius of curvature of a lens surface; $t$ is the thickness of the elements measured along the optical axis; and $s$ is the length of the air space between the elements as measured along the optical axis. For the aspheric surfaces $R_2$ and $R_4$, identified with an asterisk, the radius of curvature is that of a comparison sphere that is coincident with the asphere at the optical axis. The column "Refractive Index" of the table refers to the refractive indices of the optical media measured for the yellow helium "d" line. The column "Abbe' Value" refers to the value of each lens. Air space $S_1$ is variable for focusing purposes. The focus travel over the focus scale from infinity to approximately 2 feet is approximately 0.10 inch. Back focal length, measured from the vertex of the surface $R_6$ to the focal plane, is given as $S_3$. The materials listed have the desired optical properties for the particular lens element and are suitable for injection molding. All dimensions are measured in inches. In addition to the radii values given for the surfaces $R_2$ and $R_4$, $R_2$ is defined by the equation 1 and the following aspheric coefficients: a conic constant (CC) = $-1.0$, $A_d = 0.097278$, $A_e = -0.0088672$, $A_f = -0.14207$ and $A_g = 0.10640$. Surface $R_4$ is defined by the following coefficients for equation 1: CC = $-1.0$, $A_d = 0.13981$, $A_e = 2.2844$, $A_f = -6.4923$ and $A_g = -116.03$.

In this embodiment, $R_2$ is a strongly aspheric surface and element I is a strong converging element. $R_4$ is also strongly aspheric and element II is a strong diverging element. While the strong asphere $R_2$ maximizes the optical performance of the moving element I, to produce a well corrected lens, its effects must be compensated by other design variables. In the present design, the second aspheric surface $R_4$ provides a large degree of this compensation. Element III is a thin, weakly positive element. The lens is designed with a rear aperture stop spaced 0.05 inch behind the vertex of the surface $R_6$. The aperture stop is preferably the blades of the shutter 23, with another aperture stop 24 located 0.010 inch behind the rear element. This closer stop is significant only when the shutter is fully open.

The table below captioned "Example B" sets forth design parameters corresponding to those in the foregoing table "Example A", but for a front element focusing f/9.2 telephoto triplet with a focal length of 102.7 mm and a half field angle of 28.4°. The Example B lens is similar to the Example A lens, both having, for example, the same back focal length, but the Example B lens has a shorter effective focal length and is hence less telephoto than the Example A lens. The Example B lens utilizes three aspheric surfaces, an additional asphere being formed on the front surface $R_3$ of the middle element II as well as the rear surface $R_4$.

EXAMPLE B

| Lens Element | Refractive Index | Abbe' Value | Material | Surface Radii | Thickness and Spacing |
|---|---|---|---|---|---|
| I | 1.49 | 57.2 | Polymethyl Methacrylate | $R_1 = 0.784370$<br>$R_2 = -75.978194$* | $t_1 = 0.251$<br>$s_1 = 0.053$<br>(at) |
| II | 1.59 | 30.8 | Polystyrene | $R_3 = -1.526865$*<br>$R_4 = 0.749542$* | $t_2 = 0.096$<br>$s_2 = 0.206$ |
| III | 1.59 | 30.8 | Polystyrene | $R_5 = 1.882067$<br>$R_6 = -1.559906$ | $t_3 = 0.050$<br>$s_3 = 3.60$ |

As in Example A, the spacing $S_1$ is variable to provide focusing. The focusing scale is from infinity to approximately 2 feet. The spacing from the vertex of the surface $R_6$ to the rear aperture stop 23 is 0.05 inch. The aspheric coefficient for $R_2$ are: $CC = -1.0$, $A_d = -0.0010142$, $A_e = 0.51865$ $A_f = -1.2852$ and $A_g = 0.059210$. The aspheric coefficients for $R_3$ are: $CC = 0.0$, $A_d = -0.069251$, $A_e = 3.8347$, $A_f = 12.232$ and $A_g = 5.9545$. The aspheric coefficients for $R_4$ are: $CC = -1.0$, $A_d = 0.11531$, $A_e = -1.6051$, $A_f = 69.847$ and $A_g = -204.50$.

With reference to FIG. 4, another all plastic triplet embodiment of the invention is described below in table "Example C" corresponding in format to the foregoing tables. The Example C embodiment has a numerical aperture of f/9.2, a focal length of 130.8 mm and a half field angle of 23°. A distinguishing feature of this design is that the aperture stop is a shutter located between the second and third elements. The Example C lens, like the Example B lens, has three aspheric surfaces.

EXAMPLE C

| Lens Element | Refractive Index | Abbe' Value | Material | Surface Radii | Thickness and Spacing |
|---|---|---|---|---|---|
| I | 1.49 | 57.2 | Polymethyl Methacrylate | $R_1 = 0.745298$<br>$R_2 = 51.124230$* | $t_1 = 0.214$<br>$s_1 = 0.037$<br>(at ∞) |
| II | 1.59 | 30.8 | Polystyrene | $R_3 = -3.745741$*<br>$R_4 = 0.666883$* | $t_2 = 0.070$<br>$s_2 = 0.113$ |
| III | 1.59 | 30.8 | Polystyrene | $R_5 = 1.53415$<br>$R_6 = -5.090146$ | $t_3 = 0.100$<br>$s_3 = 4.563$ |

As in Examples A and B, the spacing $S_1$ is variable to provide focusing. The focusing scale is from infinity to approximately two feet. The spacing from the vertex of the surface $R_4$ to the shutter is 0.090 inch. The surfaces $R_2$, $R_3$ and $R_4$ are aspheric as noted above by the asterisks. The aspheric coefficient for $R_2$ are: $CC = 11285.0$, $A_d = 0.13721$, $A_e = 0.11089$, $A_f = 0.43584$ and $A_g = -11.636$. The aspheric coefficients for $R_3$ are: $CC = -5.2793$, $A_d = 0.018896$, $A_e = 0.30672$, $A_f = 0.28447$ and $A_g = 2.7143$. The aspheric coefficients for $R_4$ are: $CC = -0.12882$, $A_d = -.044608$, $A_e = -2.9615$, $A_f = -7.7798$ and $A_g = 319.39$.

In each of the foregoing examples, the strongly aspheric surface $R_2$ of the moving front element I approximately corrects at least the lower order lens aberrations of the moving element thereby maximizing the optical performance of the single moving element. As a result, the front element can be moved axially with respect to the stationary lens elements II and III to focus the lens over a wide scale, typically from infinity to 2 feet. In particular, this is a substantial improvement over the plastic triplet currently used by Polaroid Corporation in its "Pronto!" rigid self-developing camera which focuses from infinity to approximately three and one half feet.

The alpha numbers for the strong aspheric surfaces of the Example A, B and C lenses are given below in Table I. As a measure of the strength of the strong moving element I in the Example A, B and C lenses, Table I also includes the effective focal length of this element. For each "example" lens, the power of the strong element (measured as the reciprocal of the effective focal length) is approximately three times the power of the entire lens system.

TABLE I

| Lens | Aspheric Lens Surface | Alpha Number ($\times 10^{-4}$) | Effective Focal Length of Element I |
|---|---|---|---|
| Example A | $R_2$<br>$R_4$ | 30.1<br>7.76 | 1.599 inch |
| Example B | $R_2$<br>$R_3$<br>$R_4$ | 3.57<br>4.11<br>3.34 | 1.581 inch |
| Example C | $R_2$<br>$R_3$<br>$R_4$ | 7.17<br>1.92<br>7.24 | 1.536 inch |

The graphs depicted in FIGS. 6–12 provide a summary of the optical performance of the aspheric triplet lens described above in table "Example A" and illustrated in FIGS. 1–3. FIGS. 13–19 provide the same performance evaluation for the non-aspheric plastic triplet described in the Grey U.S. Pat. No. 3,578,847 patent. The Example A aspheric lens and the Grey triplet have the same numerical aperture and back focal length. The Example A lens is slightly more telephoto than the Grey lens.

These graphs represent the results of computer generated spot diagrams. Each curve is plotted from spot diagrams for a theoretical object point sources on axis, at 0.4, 0.7 and full field (1.0). For an 80 mm by 80 mm format, full field corresponds to a distance of approximately 2.2 inches from the center of the film plane to a corner. Each spot diagram is produced by 300 rays traced in three colors (100 in each color and with C, D and F lines given equal weighting) with each ray originating at one of the point sources and landing on a reference plane coincident with the film plane.

Figure 6:
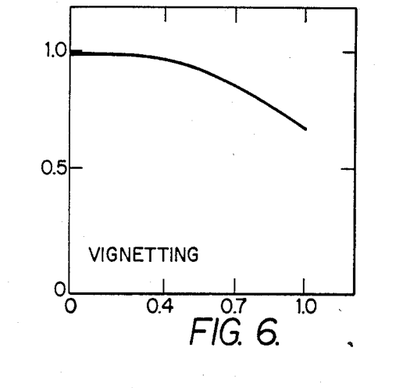
FIGS. 6-12 are graphs showing the vignetting, RMS blur, distortion and field sag of the lens shown in FIGS. 1-3 with various object heights normalized to 1.0 at the full half field angle.
Figure 13:
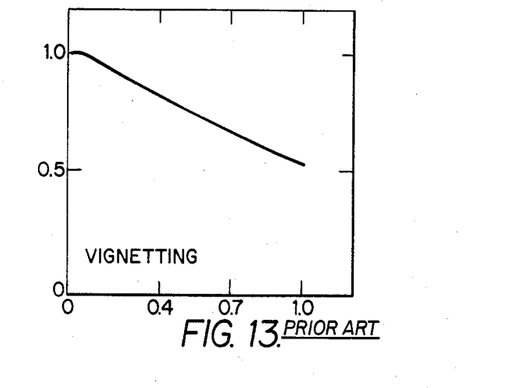
FIGS. 13-19 are graphs corresponding to FIGS. 6-12, respectively, for the best comparable non-aspheric plastic triplet, i.e. for a prior art lens.

FIGS. 6 and 13 demonstrate the vignetting of the lenses. Vignetting for a field point is calculated by dividing the number of rays which strike the film plane by the number of rays which strike the film plane on axis. A comparison of FIGS. 6 and 13 shows that the Example A aspheric lens exhibits considerably less vignetting than the Grey triplet. The vignetting is the same for all focus positions.

Figure 7:
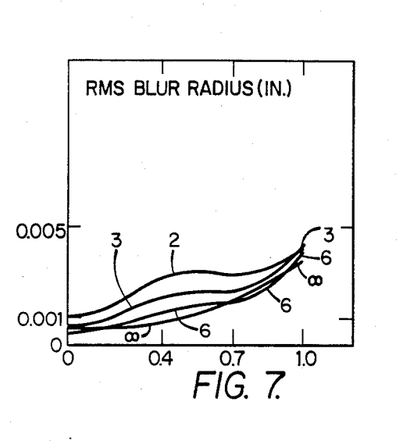
Figure 14:
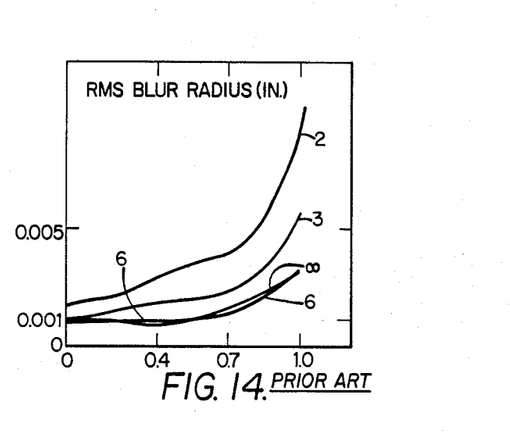

FIGS. 7 and 14 demonstrate the RMS (root mean square) blur of the aspheric and the Grey lenses, respectively, at four focus positions: infinity, 6, 3 and 2 feet. RMS blur corresponds to the circle of confusion and represents the combined effect of all aberrations except distortion. To determine the RMS blur, the centroid of the spot diagram is calculated and a vector is drawn from the centroid to each spot (the point where the ray lands in the reference plane). The root-mean-square magnitude of these vectors is then calculated to yield the RMS blur, a radius. If the reference plane is the film plane, as it is here, and the film is flat, blur will become visible at an RMS blur value of 0.0018 inch, corresponding to a conventional circle of confusion diameter of 0.005 inch. An RMS blur radius in excess of 0.005 inch usually indicates image degradation to a commercially unacceptable level. A comparison of FIGS. 7 and 14 demonstrates that the Example A aspheric lens is comparable to the Grey triplet at infinity and markedly superior to the Grey lens at closer object distances.

Figure 8:
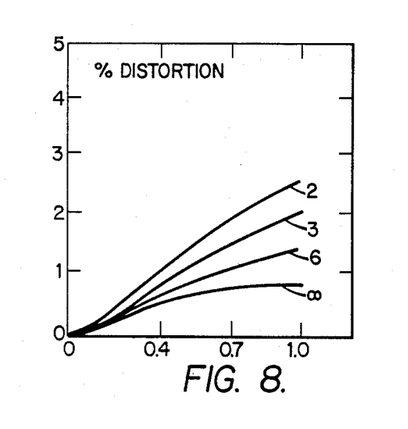
Figure 9:
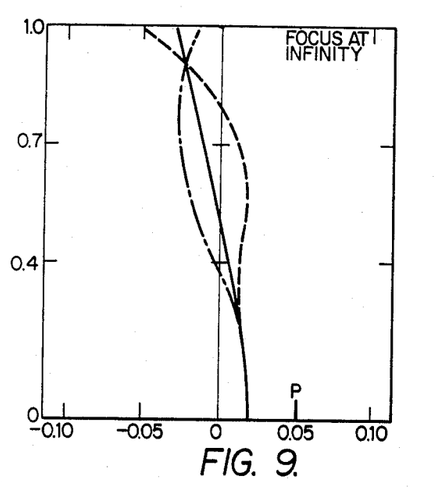
Figure 10:
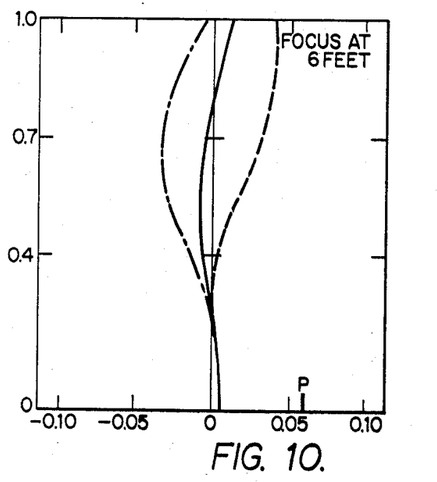
Figure 11:
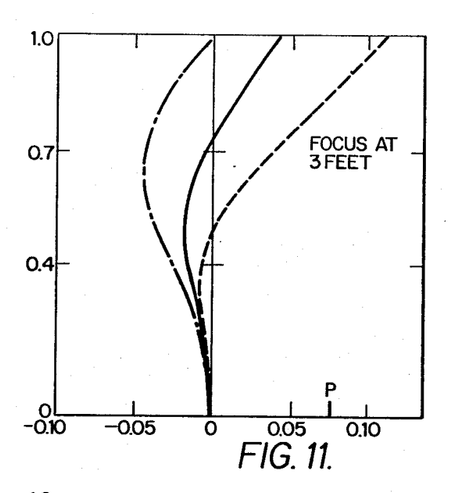
Figure 12:
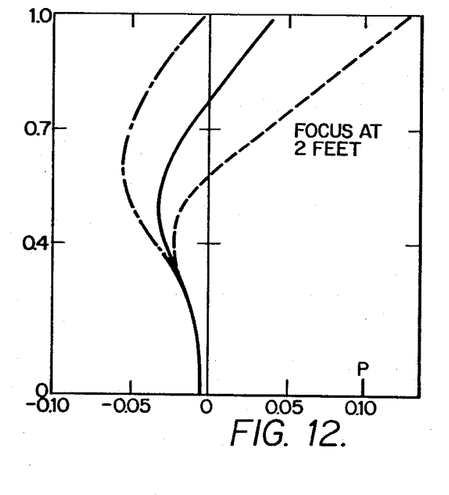
Figure 15:
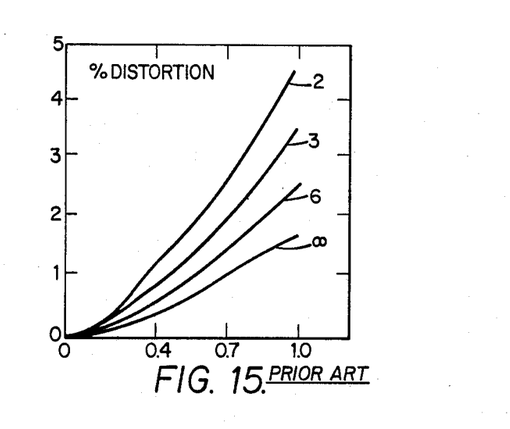
Figure 16:
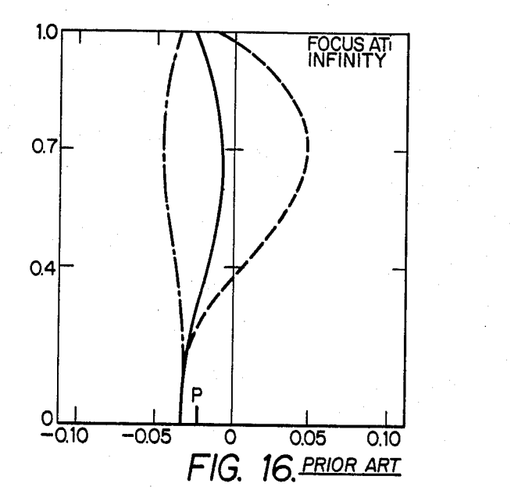
Figure 17:
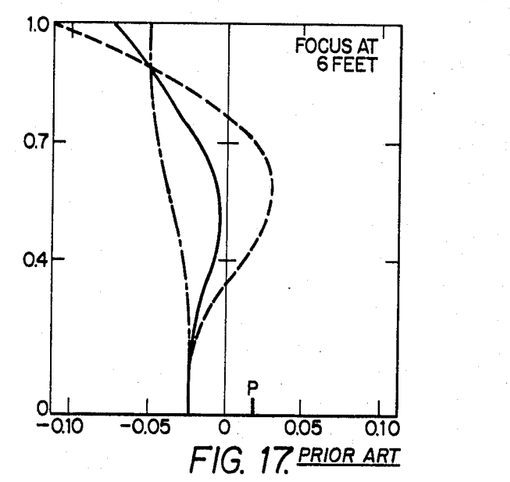
Figure 18:
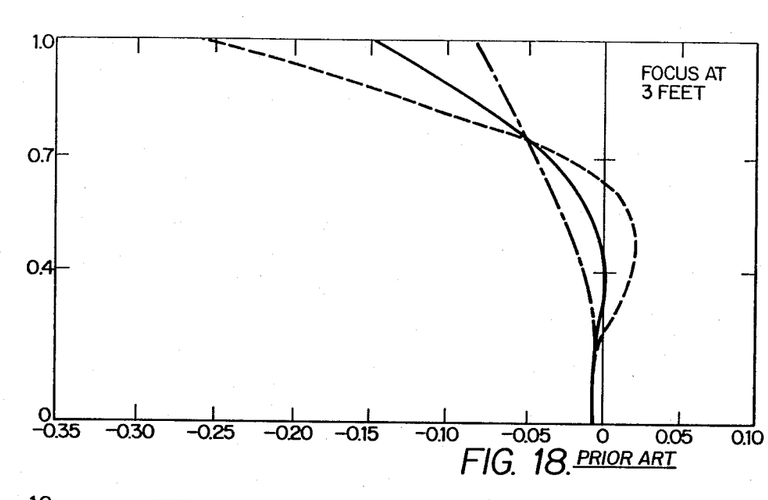
Figure 19:
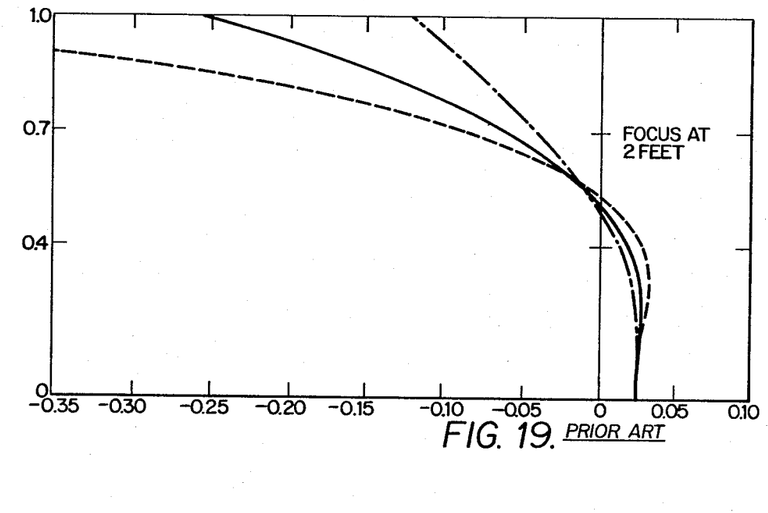

FIGS. 8 and 15 demonstrate the distortion of the Example A lens and Grey triplet, respectively, at infinity, 6, 3 and 2 feet. Distortion is calculated from the spot diagram by measuring the displacement of the spot diagram centroid from the paraxial chief ray. The distortion percentage figure plotted as the abscissa of FIGS. 8 and 12 is the ratio of this displacement to the paraxial chief ray height, times 100. With the reference plane as the film plane, the distortion is actual distortion as it would appear in a developed print. Positive distortion is pincushion; negative distortion is barrel. In general, while distortion is preferably less than 2%, distortion up to 5% may be acceptable. A comparison of FIGS. 8 and 15 demonstrates that the Example A aspheric triplet generally has less distortion than the Grey triplet.

FIGS. 9-12 represent the field sag of the Example A lens at four focus positions: infinity, 6, 3 and 2 feet. FIGS. 16-19 represent the field sag of the Grey triplet at the same focus positions. Each graph describes the field curvature of the lens, its astigmatism and its state of focus. Sagittal points on the graphs are marked with x's and connected with dash-and-dot lines; tangential points are marked with 0's and connected with dashed lines. The axial distance from the lens to the image surface at which RMS blur is minimized is plotted with solid circles. This is the best RMS image surface or, in other words, the locus of the circle of least confusion in the RMS sense. The vertical axes of FIGS. 9-19 are the same as the horizontal axes of FIGS. 6-8 and 13-15. The horizontal axes represent axial distance measured from the vertex of the rear surface of the rear lens element. A comparison of the field sag of the Example A aspheric lens and the Grey triplet demonstrates that the Example A lens performance is comparable to that of the Grey triplet when focused at infinity, and decidedly superior at closer focus positions. In summary, FIGS. 6-19 demonstrate that the Example A aspheric triplet performs at least as well as the Grey triplet at large object distances, and performs significantly better at close object distances. In particular, while the lower limit on the Grey focus scale is approximately 3.5 feet, the Example A aspheric triplet performs within acceptable commercial standards at a focus of 2 feet. These results are typical of the other aspheric designs described hereinabove as well as other lens systems constructed according to this invention.

There has been described a photographic lens system that utilizes a strong aspheric surface on a strong moving element to provide an extended focus range. The invention is particularly adapted to lenses employing elements formed of plastic and used in conjunction with self-developing cameras where it is desired to have a fixed back focal length. More specifically, there has been described an improved, aspheric plastic triplet that employs front element focusing, is compatible with presently marketed rigid self-developing cameras such as the Polaroid "Pronto!" camera and can focus down to approximately two feet while at least maintaining the performance levels of lenses heretofore used on such cameras at greater object distances.

While the invention has been described above with reference to various plastic triplet embodiments, it will be understood that one skilled in the art can readily apply this invention in the design of other multi-element lenses including duplets. Four or more element lenses can be readily derived from triplets or other designs employing fewer elements by splitting the function of one element among two or more elements. Further, while the invention has been described in terms of a single aspheric element moving with respect to two fixed elements, it is within the scope of this invention to fix the strongly aspheric element and move the remaining lens elements in unison to affect focusing. It is further contemplated that the moving focusing element can be a group of elements rather than a single element. In this group, however, at least one element will be the strong element, whether positive or negative, that has a strongly aspheric surface that maximizes the optical performance of that moving group.

Other variations falling within the scope of this invention include a lens having only one strong aspheric surface, or more than three aspheres. The moving element can also be the second, third or any other element or group of elements provided it is a strong element or the moving group includes a strong element. Further variations include forming the lens from glass rather than plastic and forming aspheres on convex surfaces, rather than the concave surfaces described above. Forming aspheres on glass, however, is generally more costly than fabricating them with plastic materials. Also, as a manufacturing convenience, it is preferred to machine aspheric surfaces on a convex insert surface which produces a concave aspheric surface.

Finally, it will be understood that lenses can be designed using this invention that have a wide variety of numerical apertures, focal lengths, stop locations, light baffles and other design features depending on the requirements of the optical system utilizing the lens. Thus while the invention has been described with reference to lens designs having relatively high numerical apertures and long focal lengths, the invention is not limited to such a particular lens design. However, for use with self-developing cameras, numerical apertures in excess of $f/3.8$ are usually preferred. These and various other modifications will become apparent to those skilled in the art from the foregoing detailed description and the accompanying drawings. Such modifications are intended to fall within the scope of the appended claims.

What is claimed is:

1. A single element adjustable focus photographic lens system for use in camera apparatus comprising:
 a single lens element defining an optical axis therethrough and having a high optical power of at least more than twice the optical power of said photographic lens system, said single lens element also including a strong aspheric surface thereon to correct low order aberrations and particularly low order sperical aberrations directly associated therewith;
 optical means comprising at least two lens elements disposed along said optical axis in spaced apart optical alignment with respect to said single lens element; and
 adjustable focusing means for retaining said single lens element and said lens means in spaced apart optical alignment with respect to each other and for changing the spacing between said single lens element and said optical means along said optical axis to alter the focus of said lens system in response to an adjustment of said focusing means while simultaneously maintaining a fixed determinate spacing between said lens elements of said optical means, said strong aspheric surface operating to maintain a balance in the correction of low order aberrations and particularly low order spherical aberrations directly associated with said single lens element as said spacing between said single lens element and said lens optical means along said optical axis is altered to effect a change in focus over a wide focus scale.

2. The lens system of claim 1 wherein said single lens element is positive and located in the front of said lens system.

3. The lens system of claim 2 wherein said single lens element is movable with respect to said optical means.

4. The lens system of claim 1 wherein said lens system is a triplet with said optical means consisting of two lens elements.

5. The lens system of claim 4 further including a light baffle located intermediate said two lens elements of said lens component.

6. The lens system of claim 4 wherein said single lens element is positive and located in the front of said lens system, one of said two lens elements of said optical means is positive and located in the rear of said lens system and the other of said two lens elements is negative and located between said single lens element and said one lens element of said optical means.

7. The lens system of claim 6 wherein said strong aspheric surface is formed on the rear surface of said single lens element.

8. A front-element focusing, axially aligned, three element, air spaced, telephoto objective lens system with a numerical aperture of $f/9.2$, a focal length of 114.3 mm and an object field half angle of 26.4° having the following characteristics:

| Lens Element | Refractive Index | Abbe' Value | Material | Surface Radii | Thickness and Spacing |
|---|---|---|---|---|---|
| I | 1.49 | 57.2 | Polymethyl Methacrylate | $R_1 = .782023$<br>$R_2 = 125.366*$ | $t_1 = .258$<br>$s_1 = .067$<br>(at $\infty$) |
| II | 1.59 | 30.8 | Polystyrene | $R_3 = -5.724178$<br>$R_4 = .666047*$ | $t_2 = .198$<br>$s_2 = .206$ |
| III | 1.59 | 30.8 | Polystyrene | $R_5 = 1.772864$<br>$R_6 = 4.44798$ | $t_3 = .051$<br>$s_3 = 3.60$ | wherein the lens elements are identified by Roman numerals in order from front to rear; $R_1, R_2 \ldots$ represent the radii of curvature of the refractive surfaces from front to rear; $s_1$ is a variable air space, the value given being for an object at infinity; $s_3$ is the distance from the last surface to the film plane; the aspheric coefficients of $R_2$ are: $CC = -1.0$, $A_d = 0.097278$, $A_e = -0.0088672$, $A_f = -0.14207$, $A_g = 0.10640$ and the aspheric coefficients of $R_4$ are: $CC = -1.0$, $A_d = 0.13981$, $A_e = 2.2844$, $A_f = -6.4923$, $A_g = -116.03$, and where an aperture stop is located 0.050 inch behind the vertex of surface $R_6$.

9. A front-element focusing, axially aligned, three element, air spaced, telephoto objective lens system with a numerical aperture of $f/9.2$, a focal length of 102.7 mm and an object field half angle of 28.4° having the following characteristics:

| Lens Element | Refractive Index | Abbe' Value | Material | Surface Radii | Thickness and Spacing |
|---|---|---|---|---|---|
| I | 1.49 | 57.2 | Polymethyl Methacrylate | $R = 0.78430$<br>$R_2 = -75.978194*$ | $t_1 = 0.251$<br>$s_1 = 0.053$<br>(at $\infty$) |
| II | 1.59 | 30.8 | Polystyrene | $R_3 = -1.526865*$<br>$R_4 = 0.749542*$ | $t_2 = 0.096$<br>$s_2 = 0.206$ |
| III | 1.59 | 30.8 | Polystyrene | $R_5 = 1.882067$ | $t_3 = 0.050$ |

-continued

| Lens Element | Refractive Index | Abbe' Value | Material | Surface Radii | Thickness and Spacing |
|---|---|---|---|---|---|
| | | | | $R_6 = -1.559906$ | $s_3 = 3.60$ | wherein the lens elements are identified by Roman numerals in order from front to rear; $R_1, R_2 \ldots$ represent the radii of curvature of the refractive surfaces from front to rear; $s_1$ is a variable air space, the value given being for an object at infinity; $s_3$ is the distance from the last surface to the image plane; the aspheric coefficients of $R_2$ are: $CC = -1.0$, $A_d = -0.0010142$, $A_e = 0.51865$, $A_f = -1.2852$, $A_g = 0.059210$; the aspheric coefficients of $R_3$ are: $CC = 0.0$, $A_d = -0.69251$, $A_e = 3.8347$, $A_f = -12.232$, $A_g = 5.9545$; the aspheric coefficients of $R_4$ are $CC = -1.0$, $A_d = 0.11531$, $A_e = -1.6051$, $A_f = 69.847$ and $A_g = -204.50$, and where an aperture stop is located 0.050 inch behind the vertex of surface $R_6$.

10. A front element focusing, axially aligned, three element, air spaced, telephoto objective lens system with a numerical aperture of $f/9.2$, a focal length of 130.8 mm and an object field half angle of 23° having the following characteristics:

| Lens Element | Refractive Index | Abbe' Value | Material | Surface Radii | Thickness and Spacing |
|---|---|---|---|---|---|
| I | 1.49 | 57.2 | Polymethyl Methacrylate | $R_1 = 0.745298$ | $t_1 = 0.214$ |
| | | | | $R_2 = 51.124230*$ | $s_1 = 0.037$ (at $\infty$) |
| II | 1.59 | 30.8 | Polystyrene | $R_3 = -3.745741*$ | $t_2 = 0.070$ |
| | | | | $R_4 = 0.666883*$ | $s_2 = 0.113$ |
| III | 1.59 | 30.8 | Polystyrene | $R_5 = 1.535415$ | $t_3 = 0.100$ |
| | | | | $R_6 = -5.090146$ | $s_3 = 4.563$ | wherein the lens elements are identified by Roman numerals in order from front to rear; $R_1, R_2 \ldots$ represent the radii of curvature of the refractive surfaces from front to rear; $s_1$ is a variable air space, the value given being for an object at infinity; $s_3$ is the distance from the last surface to the image plane; the aspheric coefficients of $R_2$ are: $CC = 11285.0$ $A_d = 0.13721$, $A_e = 0.11089$, $A_f = 0.43584$, $A_g = -11.636$; the aspheric coefficients of $R_3$ are; $CC = -5.2793$, $A_d = 1.18896$, $A_e = 0.30672$, $A_f = 0.28447$, $A_g = 2.7143$; the aspheric coefficients of $R_4$ are $CC = -0.12882$, $A_d = -0.044608$, $A_e = -0.044608$, $A_e = -2.9615$, $A_f = -7.7798$ and $A_g = 319.39$; and where an aperture stop is located 0.050 inch behind the vertex of surface $R_6$.

* * * * *